(12) United States Patent
Matsumori et al.

(10) Patent No.: US 11,932,132 B2
(45) Date of Patent: Mar. 19, 2024

(54) POWER SUPPLY SYSTEM, CONTROL DEVICE, AND CONTROL METHOD OF POWER SUPPLY SYSTEM

(71) Applicant: TOYOTA JIDOSHA KABUSHIKI KAISHA, Toyota (JP)

(72) Inventors: Hiroshi Matsumori, Mishima (JP); Yoshihiro Sakayanagi, Mishima (JP); Manabu Handa, Susono (JP); Midori Sugiyama, Susono (JP); Hirotaka Saito, Sunto-gun (JP); Yuki Takahashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/818,817

(22) Filed: Aug. 10, 2022

(65) Prior Publication Data
US 2023/0140698 A1    May 4, 2023

(30) Foreign Application Priority Data
Nov. 1, 2021 (JP) ................. 2021-178712

(51) Int. Cl.
| | | |
|---|---|---|
| *B60L 53/62* | (2019.01) | |
| *B60L 53/66* | (2019.01) | |
| *H02J 7/00* | (2006.01) | |

(52) U.S. Cl.
CPC .............. *B60L 53/62* (2019.02); *B60L 53/66* (2019.02); *H02J 7/00032* (2020.01); *H02J 7/0047* (2013.01); *H02J 7/0063* (2013.01); *H02J 7/007188* (2020.01)

(58) Field of Classification Search
CPC .......... B60L 53/62; B60L 53/66; B60L 53/64; B60L 53/65; B60L 53/665; H02J 7/00032; H02J 7/0047; H02J 7/0063; H02J 7/007188; G06Q 50/06; G06Q 50/30; Y02T 10/70; Y02T 10/7072
See application file for complete search history.

(56) References Cited

U.S. PATENT DOCUMENTS

| | | | |
|---|---|---|---|
| 2017/0237944 A1* | 8/2017 | Haas ................ | G06V 40/10 348/143 |
| 2018/0099570 A1* | 4/2018 | Katanoda ............ | B60L 53/14 |

FOREIGN PATENT DOCUMENTS

JP   2018-064342 A   4/2018

* cited by examiner

*Primary Examiner* — Lincoln D Donovan
*Assistant Examiner* — Alex W Lam
(74) *Attorney, Agent, or Firm* — Finnegan, Henderson, Farabow, Garrett & Dunner, LLP

(57) ABSTRACT

A power supply system includes a vehicle equipped with a battery, a power supply device, and a control device that controls power supply from the power supply device to the vehicle. The vehicle includes an engine and a motor that receives the power supplied from the battery to generate traveling drive force. When the power supply by the power supply device is requested from the vehicle, the control device (a) acquires a remaining amount of fuel for the engine from the vehicle, (b) outputs an instruction to urge the vehicle to shorten a charging time when the remaining amount of fuel is larger than a reference value, and (c) sets at least one of a unit price for charging power or a unit price for fuel lower when a response to accept the instruction is received from the vehicle compared with when the instruction is not accepted.

10 Claims, 6 Drawing Sheets

POWER SUPPLY SYSTEM, CONTROL DEVICE, AND CONTROL METHOD OF POWER SUPPLY SYSTEM

CROSS-REFERENCE TO RELATED APPLICATION

This application claims priority to Japanese Patent Application No. 2021-178712 filed on Nov. 1, 2021, incorporated herein by reference in its entirety.

BACKGROUND

1. Technical Field

The present disclosure relates to a power supply system, a control device, and a control method of the power supply system and more specifically, to a technique for effectively using a power supply facility for charging a battery mounted on a vehicle.

2. Description of Related Art

In recent years, an externally chargeable vehicle (hereinafter referred to as "electrified vehicle") such as a battery electric vehicle or a plug-in hybrid electric vehicle (PHEV) that uses power from the outside to charge a battery mounted on the vehicle has increased. Along with the increased number of vehicles, a power supply facility (power supply station) for charging the electrified vehicle at a visiting place is gradually spreading.

In a hybrid electric vehicle equipped with an engine and a motor, even though a charge amount of the battery is low, the vehicle can travel or generate electricity by driving the engine. On the contrary, since the battery electric vehicle does not have an engine, the vehicle cannot travel when the power that can be output from the battery is exhausted without being charged externally. That is, the external charging is more crucial in the battery electric vehicle than in the hybrid electric vehicle.

Japanese Unexamined Patent Application Publication No. 2018-064342 (JP 2018-064342 A) discloses a configuration in which charging power in the power supply facility for the hybrid electric vehicle with a large remaining amount of fuel is set higher than power in a case of the battery electric vehicle. In the configuration of JP 2018-064342 A, since a charging fee for the hybrid electric vehicle with a large remaining amount of fuel is relatively high, an incentive to stop the charging in the power supply facility and use the fuel to travel is provided for a user of the hybrid electric vehicle. Accordingly, congestion in the power supply facility is alleviated, and the external charging can be preferentially performed for the battery electric vehicle. Therefore, it is possible to effectively use the power supply facility.

SUMMARY

On the other hand, in the charging system disclosed in JP 2018-064342 A, in a case of the hybrid electric vehicle, the battery cannot be charged in the power supply facility, or a relatively high charging fee is requested to be paid. Thus, user convenience may be impaired.

The present disclosure is provided to effectively use a power supply facility capable of performing external power supply without impairing convenience of a user of a hybrid electric vehicle.

A power supply system according to a first aspect of the present disclosure comprises a vehicle equipped with a battery that is chargeable using power from an outside, a power supply device that supplies the power to the vehicle, and a control device configured to control power supply from the power supply device to the vehicle. The vehicle includes an engine and a motor that receives the power supplied from the battery to generate traveling drive force. When the power supply by the power supply device is requested from the vehicle, the control device (i) acquires a remaining amount of fuel for the engine from the vehicle, (ii) outputs an instruction to urge the vehicle to shorten a charging time when the remaining amount of fuel is larger than a reference value, and (iii) sets at least one of a unit price for charging power or a unit price for fuel lower when a response to accept the instruction is received from the vehicle compared with when the instruction is not accepted.

According to the power supply system according to the present disclosure, when external power supply is requested from the hybrid electric vehicle equipped with the engine and the motor, the instruction to urge the vehicle to shorten the charging time is output when the remaining amount of fuel is higher than the reference value. Then, when the instruction is accepted by the user of the vehicle, a charging opportunity for subsequent battery electric vehicles is increased, and the unit price for power and/or the unit price for fuel is discounted for the hybrid electric vehicle. Therefore, it is possible to effectively use the power supply facility without impairing the convenience of the user of the hybrid electric vehicle.

In one embodiment, the instruction includes information proposing a charge amount smaller than a charge amount requested for the battery.

With such a configuration, it is possible to propose a reduction in the charge amount to the user to urge the user to shorten the charging time.

In one embodiment, the instruction includes information proposing a charging time less than a charging time requested for the battery.

With such a configuration, it is possible to urge the user to shorten the charging time.

A power supply system according to a second aspect of the present disclosure comprises a vehicle equipped with a battery that is chargeable using power from an outside, a power supply facility including a power supply device configured to supply the power to the vehicle, and a control device configured to control power supply to the vehicle in the power supply facility. The power supply device includes an alternating-current power supply device and a direct-current power supply device. The vehicle includes an engine and a motor that receives the power supplied from the battery to generate traveling drive force. The vehicle is configured to support both alternating-current charging using alternating-current power from the alternating-current power supply device and direct-current rapid charging using direct-current power from the direct-current power supply device. When the power supply by the direct-current power supply device is requested from the vehicle, the control device (i) acquires a remaining amount of fuel for the engine from the vehicle, (ii) outputs an instruction to urge the vehicle to perform the power supply by the alternating-current power supply device when the remaining amount of fuel is larger than a reference value, and (iii) sets at least one of a unit price for charging power or a unit price for fuel lower when a response to accept the instruction is received front the vehicle compared with when the instruction is not accepted.

With the power supply system according to the present disclosure, when the external power supply using the direct-current power supply device is requested, to the power supply device having the alternating-current power supply device and the direct-current power supply device, from the hybrid electric vehicle equipped with the engine and the motor, the instruction to urge the vehicle to perform the power supply by the alternating-current power supply device is output when the remaining amount of fuel is higher than the reference value. Then, when the instruction is accepted by the user of the vehicle, the unit price for power and/or the unit price for fuel is discounted. Therefore, it is possible to effectively use the power supply facility without impairing the convenience of the user of the hybrid electric vehicle.

In one embodiment, the power supply system further comprises a camera that detects a state of the power supply device. The control device outputs the instruction when the power supply device is determined to be congested from a video of the camera.

With such a configuration, an instruction to reduce the charge amount or change the charging method is issued solely when the power supply facility is congested from the video of the camera. Therefore, when the preferential use for the battery electric vehicle is not requested, the charging is executed as requested by the user of the hybrid electric vehicle. Therefore, it is possible to effectively use the power supply facility without impairing the convenience of the user of the hybrid electric vehicle.

A power supply system according to a third aspect of the present disclosure comprises a vehicle equipped with a battery that is chargeable using power from an outside, a power supply facility including a power supply device configured to supply the power to the vehicle, a camera that detects a state of the power supply device, and a control device configured to control power supply from the power supply device to the vehicle. The vehicle includes an engine and a motor that receives the power supplied from the battery to generate traveling drive force, and a communication device configured to perform wireless communication with the power supply device. When the power supply by the power supply device is reserved from the vehicle and the power supply device is determined to be congested from a video of the camera, the control device (i) acquires a remaining amount of fuel for the engine from the vehicle, (ii) outputs an instruction to urge the vehicle to shift to another power supply facility when the remaining amount of fuel is larger than a reference value, and (iii) sets at least one of a unit price for charging power or a unit price for fuel lower when a response to accept the instruction is received from the vehicle compared with when the instruction is not accepted.

With the power supply system according to the present disclosure, when the external power supply is reserved from the hybrid electric vehicle and when the power supply facility is congested, the instruction to urge the vehicle to shift to another power supply facility is output when the remaining amount of fuel is higher than the reference value. Then, when the instruction is accepted by the user of the vehicle, the unit price for power and/or the unit price for fuel is discounted. Since the instruction to shift to another power supply facility is issued at the time of charging reservation, unnecessary shift to the power supply facility can be suppressed. Therefore, it is possible to effectively use the power supply facility without impairing the convenience of the user of the hybrid electric vehicle.

In one embodiment, the control device is disposed in the power supply device.

With such a configuration, processing can be executed in the power supply device.

In one embodiment, the control device is a server configured to communicate with the power supply device.

With such a configuration, processing can be centrally executed by a server located remotely.

A control device according to a fourth aspect of the present disclosure is a control device configured to control a power supply system that charges a battery mounted on a vehicle having an engine by using power from a power supply device. The control device comprises a processor and a memory that stores a program executed by the processor. The processor, when power supply by the power supply device is requested from the vehicle, (i) acquires a remaining amount of fuel for the engine from the vehicle, (ii) outputs an instruction to urge the vehicle to shorten a charging time when the remaining amount of fuel is larger than a reference value, and (iii) sets at least one of a unit price for charging power or a unit price for fuel lower when a response to accept the instruction is received from the vehicle compared with when the instruction is not accepted.

With the control device according to the present disclosure, when the external power supply is requested from the hybrid electric vehicle equipped with the engine and the motor, the instruction to urge the vehicle to shorten the charging time is output when the remaining amount of fuel is higher than the reference value. Then, when the instruction is accepted by the user of the vehicle, the unit price for power and/or the unit price for fuel is discounted. Therefore, it is possible to effectively use the power supply facility without impairing the convenience of the user of the hybrid electric vehicle.

A method according to a fifth aspect of the present disclosure relates to a method for controlling a power supply system that charges a battery mounted on a vehicle having an engine by using power from a power supply device. The method comprises (i) a step of determining whether or not power supply by the power supply device is requested from the vehicle, (ii) a step of acquiring a remaining amount of fuel for the engine from the vehicle, (iii) a step of outputting an instruction to urge the vehicle to shorten a charging time when the power supply by the power supply device is requested and the remaining amount of fuel is larger than a reference value, and (iv) a step of setting at least one of a unit price for charging power or a unit price for fuel lower when a response to accept the instruction is received from the vehicle compared with when the instruction is not accepted.

With the control method of the power supply system according to the present disclosure, when the external power supply is requested from the hybrid electric vehicle equipped with the engine and the motor, the instruction to urge the vehicle to shorten the charging time is output when the remaining amount of fuel is higher than the reference value. Then, when the instruction is accepted by the user of the vehicle, the unit price for power and/or the unit price for fuel is discounted. Therefore, it is possible to effectively use the power supply facility without impairing the convenience of the user of the hybrid electric vehicle.

According to the power supply system according to the present disclosure, when the external power supply is requested front the hybrid electric vehicle equipped with the engine and the motor, the instruction to urge the vehicle to shorten the charging time output when the remaining amount of fuel is higher than the reference value. Then, when the instruction is accepted by the user of the vehicle, the unit price for power and/or the unit price for fuel is discounted. Therefore, it is possible to effectively use the power supply facility without impairing the convenience of the user of the hybrid electric vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
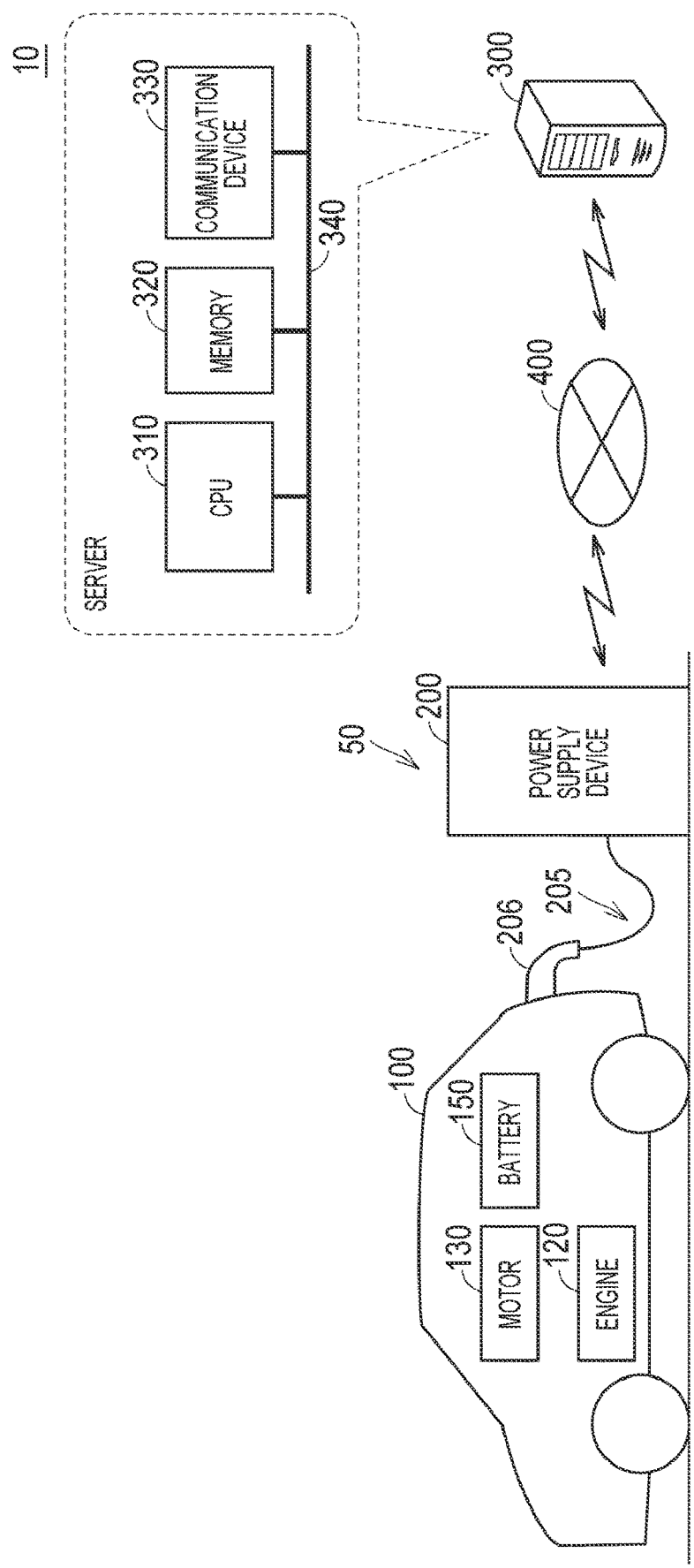
FIG. 1 is an overall schematic view of a power supply system according to a first embodiment.

Hereinafter, embodiments of the present disclosure will be described in detail with reference to drawings. The same or corresponding parts in the drawings are designated by the same reference numerals or a description thereof will not be repeated.

First Embodiment

System Overview

FIG. 1 is an overall schematic view of a power supply system 10 according to the present embodiment. With reference to FIG. 1, the power supply system 10 includes a vehicle 100, a power supply device 200 disposed in a power supply facility 50, and a server 300. Although solely one power supply device 200 is shown in FIG. 1, the power supply facility 50 may include two or more power supply devices 200.

The vehicle 100 includes an engine 120, a motor 130, and a battery 150. The vehicle 100 is a so-called hybrid electric vehicle capable of traveling using drive force generated by the engine 120 and/or the motor 130. The motor 130 is driven by power from the battery 150. The battery 150 can be charged by the power supplied from the power supply device 200 provided outside the vehicle 100 via a power supply cable 205. That is, the vehicle 100 is a plug-in type hybrid electric vehicle.

The power supply device 200 converts alternating-current power received from a system power source into alternating-current power or direct-current power having a voltage suitable for the vehicle 100 and supplies the converted power to the vehicle 100. The power supply device 200 can communicate with the vehicle 100 by wire by connecting a connector 206 provided at an end portion of the power supply cable 205 to an inlet of the vehicle 100. In addition, the power supply device 200 may be configured to wirelessly communicate with the vehicle 100.

The power supply device 200 and the server 300 are configured to communicate with each other via a communication network 400, such as the Internet. The communication between the server 300 and the communication network 400 may be wired or wireless.

The server 300 includes a processor 310, a memory 320, and a communication device 330. The processor 310, the memory 320, and the communication device 330 are connected to each other by a common bus 340 and are configured to exchange information with each other.

The processor 310 is, for example, a central processing unit (CPU) and is configured to execute a predetermined calculation processing described in a program. The memory 320 includes a read only memory (ROM) and a random access memory (RAM). The ROM stores the program executed by the processor 310. The RAM temporarily stores data generated by the execution of the program in the processor 310 and data input via the communication device 330. The RAM also functions as a temporary data memory used as a work area.

The communication device 330 is a communication interface for exchanging data with the power supply device 200 via the communication network 400. As described above, the communication between the server 300 and the communication network 400 is performed by wire or wirelessly.

Configuration of Vehicle and Power Supply Device

Next, detailed configurations of the vehicle 100 and the power supply device 200 will be described with reference to FIG. 2. First, the configuration of the vehicle 100 will be described with reference to FIG. 2. The vehicle 100 further includes an electronic control unit (ECU) 110 which is a control device, a power control unit (PCU) 140 which is a drive device, a charger 160, an inlet 170, a communication device 180, and a navigation device (Navi) 190, in addition to the engine 120, the motor 130, and the battery 150.

The connector 206 of the power supply cable 205 provided in the power supply device 200 is connected to the inlet 170. The power supply cable 205 includes a power line for power transmission and a control line for control signal transmission. The power supplied from the power supply device 200 via the power supply cable 205 is transmitted to the charger 160. A control signal supplied from the power supply device 200 is transmitted to the ECU 110.

The charger 160 is configured to include, for example, an alternating current/direct current converter or a rectifier. The charger 160 is controlled by the ECU 110 and converts the alternating-current power transmitted from the power supply device 200 via the power supply cable 205 and the inlet 170 into direct-current power suitable for charging the battery 150 to charge the battery 150. The battery 150 is an assembled battery including a plurality of cells, and each cell included in the battery 150 is a secondary battery, such as a lithium ion battery or a nickel-hydrogen battery. The battery 150 can also be charged by power generated by a regenerative operation such as when the motor 130 is decelerated and power generated by the motor 130 due to driving of the engine 120.

The PCU 140 is configured to include, for example, a direct current/direct current converter and an inverter. The PCU 140 converts the direct-current power from the battery 150 into the alternating-current power to drive the motor 130. The vehicle 100 travels by the drive force generated by the motor 130 and/or the drive force generated by the engine 120.

The communication device 180 is a communication interface for wirelessly exchanging a signal with the outside. Me communication device 180 can communicate with an external device via the communication network 400. Further, the communication device 180 is configured to communicate with a communication device 230 of the power supply device 200.

The navigation device 190 includes a touch panel (not shown) and presents a traveling route to a destination designated by a user to guide the user. The navigation device 190 transmits the destination information input by the user to an external server via the communication device 180, receives candidate information of the traveling route to the destination searched by the external server, and displays the received information on the touch panel. When the user selects a desired traveling route from displayed candidates, the navigation device 190 guides the user based on the selected traveling route.

The ECU 110 is configured to include a CPU and a memory (both are not shown) and integrally controls each device included in the vehicle 100. During the traveling, the ECU 110 controls the engine 120 and the PCU 140 based on operations of an accelerator, a steering wheel, a brake, and the like by the user to cause the vehicle 100 to travel.

During the charging of the battery 150, when the connector 206 of the power supply cable 205 is connected, the ECU 110 transmits vehicle information to the power supply device 200. Then, when the power is supplied from the power supply device 200, the charger 160 is controlled to charge the battery 150.

Next, the configuration of the power supply device 200 will be described. The power supply device 200 includes a charging device 210, a control device 220, and a communication device 230. When the power supply facility 50 includes a plurality of power supply devices, the control device 220 and the communication device 230 may be provided as common devices for the power supply devices.

The charging device 210 is connected to an alternating-current power supply 260 disposed outside the power supply device 200. The charging device 210 converts the alternating-current power received from the alternating-current power supply 260 into alternating-current power having a predetermined frequency according to a command from the control device 220 and supplies the converted power to the vehicle 100 via the power supply cable 205.

The control device 220 is configured to include a CPU and a memory (both are not shown) and integrally controls other devices in the power supply device 200. Specifically, the control device 220 controls the charging device 210 based on the information received from the vehicle 100 received via the power supply cable 205 or the communication device 230 to adjust the power supplied to the vehicle 100.

Further, the control device 220 receives a video from a camera 250 disposed in the power supply facility 50 and determines a congestion situation of the power supply facility 50 based on the video information.

The communication device 230 is a communication interface for wirelessly communicating with the vehicle 100 and the communication network 400. The control device 220 receives charge reservation information from the vehicle 100, transmits the congestion information of the power supply facility 50, and the like via the communication device 230.

The vehicle to which the power from the power supply device 200 can be supplied is not limited to the hybrid electric vehicle having the engine as described above. The power can be supplied also to the battery electric vehicle that travels by the drive force of solely the motor.

Description of Congestion Alleviation Control

In general, a time requested to supply the power to the battery is longer than a time requested to refuel fuel such as gasoline. That is, a time during which the power supply device is occupied for charging the battery is relatively long. Therefore, when the electrified vehicles such as the hybrid electric vehicle and the battery electric vehicle become widespread and the number of vehicles to be supplied with power increases, there is a high possibility that the power supply facility is congested.

In the hybrid electric vehicle that also uses the engine, even though the power stored in the battery is exhausted, the vehicle can continuously travel by using the drive force of the engine and/or the power generated by the driving of the engine when there is a remaining amount of fuel. On the other hand, in a case of the battery electric vehicle that travels using solely the power of the battery, the vehicle cannot travel when the power in the battery is exhausted. That is, a decrease in the charging power in the battery electric vehicle may cause a more serious problem than a decrease in the charging power in the hybrid electric vehicle.

Therefore, especially in a situation where the power supply facility is congested, it is preferable to prioritize the charging of the battery electric vehicle over the hybrid electric vehicle from the viewpoint of suppressing the out of electricity of the battery electric vehicle. On the other hand, in the hybrid electric vehicle, when the charging of the battery electric vehicle is always prioritized over the hybrid electric vehicle, the charging cannot be performed at a desired timing or the charging cannot be performed even when the need for charging is high due to a low remaining amount of fuel. Thus, convenience may be impaired.

Therefore, in the power supply system of the first embodiment, when the power supply is requested from the hybrid electric vehicle with a relatively large remaining amount of fuel when the power supply facility is congested, "congestion alleviation control" is performed in which a proposal is made to urge the user of the hybrid electric vehicle to shorten a power supply time to increase a use turnover rate of the power supply device and thus to facilitate the execution of the charging of the battery electric vehicle. Further, in the congestion alleviation control of the first embodiment, a unit price for power and/or a unit price for fuel of the charging power is discounted for the hybrid electric vehicle responding to the request for shortening the power supply time, as the consideration for cooperation for the congestion alleviation.

With such a configuration, when the need for charging is high, even the hybrid electric vehicle can be charged with the same priority as the battery electric vehicle. Further, when the need for charging is relatively low, it is possible to obtain benefits due to the reduction in the power unit price and/or the fuel unit price. Therefore, it is possible to effectively use the power supply facility without impairing the convenience of the user of the hybrid electric vehicle.

Figure 3:
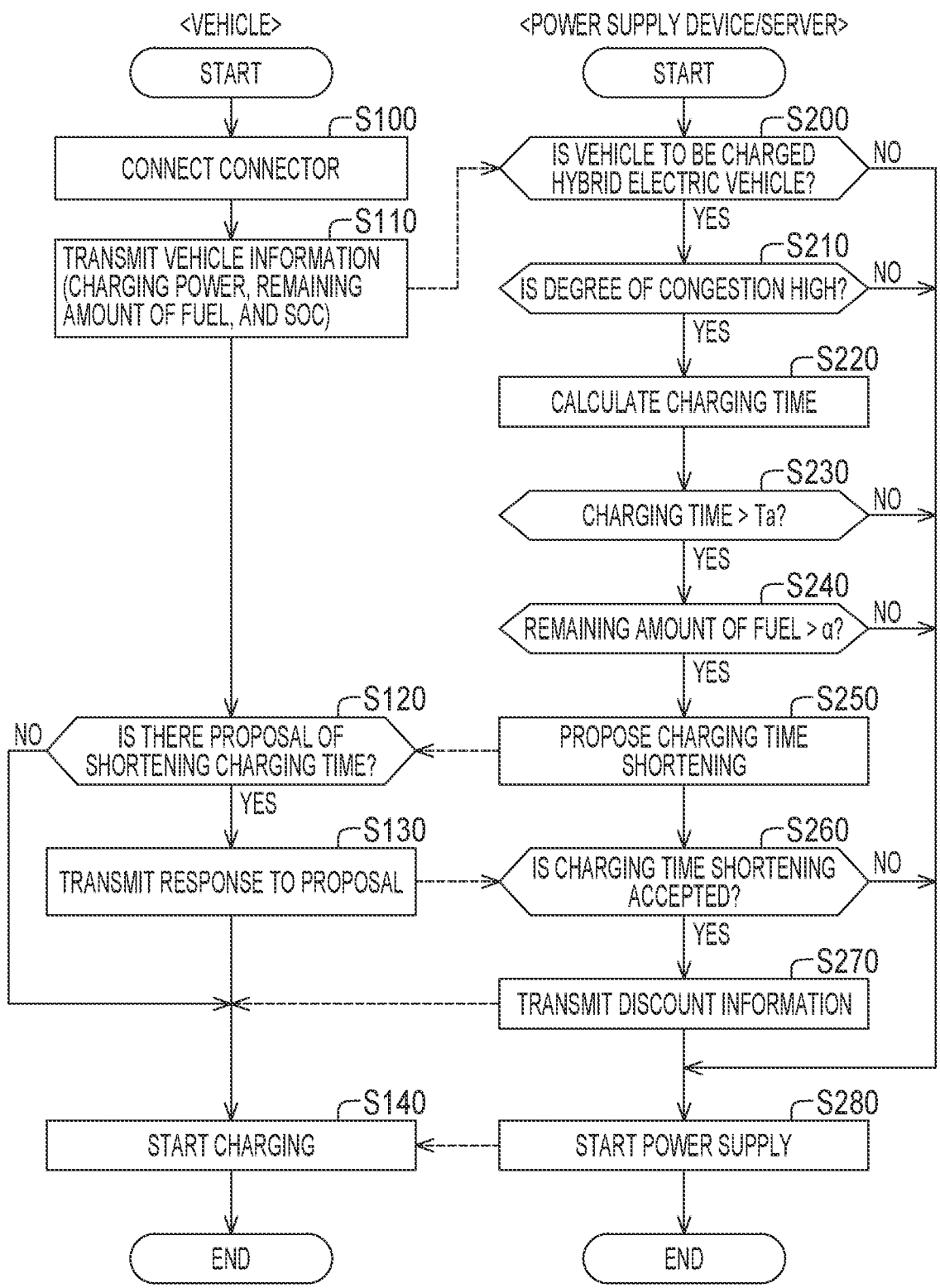
FIG. 3 is a flowchart for describing control executed in the power supply system of FIG. 1.

FIG. 3 is a flowchart for describing the congestion alleviation control executed in the power supply system 10 according to the first embodiment. In the following, a case will be described in which the congestion alleviation control is executed in the vehicle 100 and the power supply device 200, but a part or all of the control of the power supply device 200 may be executed in the server 300.

The flowchart of FIG. 3 is called from a main routine when a predetermined condition is satisfied for execution in the ECU 110 of the vehicle 100 and the control device 220 of the power supply device 200. Each step in the flowchart is realized by software processing of the ECU 110 and the control device 220, but some or all the steps may be realized by hardware such as large scale integration (LSI) included in the ECU 110 and the control device 220.

First, the control in the vehicle 100 will be described with reference to FIG. 3. When the connector 206 of the power supply cable 205 is connected to the inlet 170 of the vehicle 100 in step (hereinafter step is abbreviated as S) 100, the ECU 110 of the vehicle 100 transmits vehicle information including a vehicle ID, allowable charging power, a remaining amount of fuel, and SOC to the power supply device 200 in S110.

Thereafter, in S120, the ECU 110 determines whether or not there is a proposal of shortening the charging time from the power supply device 200. When there is no proposal of shortening the charging time from the power supply device 200 (NO in S120), the processing proceeds to S140, and the ECU 110 executes an operation to charge the battery 150 using the power supplied from the power supply device 200.

On the other hand, when there is the proposal of shortening the charging time from the power supply device 200 (YES in S120), the processing proceeds to S130, and the ECU 110 transmits a response as to whether or not to accept the proposal to the power supply device 200 according to the user's operation. As will be described below, when the proposal of shortening the charging time is accepted, discount information (for example, coupon or point) indicating a discount on a unit price for charging (or discount on unit price for fuel) is transmitted from the power supply device 200. By using the discount information, the user of the vehicle 100 can execute the charging this time or subsequent times or refueling subsequent times at a unit price cheaper than usual.

Next, the control in the power supply device 200 will be described. When the vehicle information is received from the vehicle 100 via the power supply cable 205, the control device 220 of the power supply device 200 determines in S200 whether or not the vehicle 100 to be charged is the hybrid electric vehicle. When the vehicle 100 to be charged is the battery electric vehicle instead of the hybrid electric vehicle (NO in S200), subsequent processing of S210 to S270 is skipped, and the control device 220 starts the power supply in response to the request from the vehicle 100 in S280.

When the vehicle 100 to be charged is the hybrid electric vehicle (YES in S200), the processing proceeds to S210, and the control device 220 calculates a degree of congestion of the power supply facility 50 and the power supply device 200 based on a video from the camera 250 to determine whether or not the degree of congestion is larger than a predetermined value. The degree of congestion is determined based on, for example, the number of vehicles waiting for the power supply included in the video of the camera 250. Alternatively, in a case of the power supply facility that can be reserved for the power supply, the degree of congestion may be determined based on the current number of reserved vehicles.

When the degree of congestion is low (NO in S210), priority charging to the battery electric vehicle is unnecessary. Therefore, the processing proceeds to S280, and the control device 220 starts to supply the power to the vehicle 100. When the degree of congestion is high (YES in S210), the processing proceeds to S220, and the control device 220 calculates a prediction time until the charging is completed based on the SOC of the vehicle 100 and allowable charging power. Then, the control device 220 determines in S230 whether or not the predicted charging time calculated in S220 is larger than a threshold value Ta. The threshold value Ta is, for example, 10 minutes.

When the predicted charging time is equal to or less than the threshold value Ta (NO in S230), the power supply processing is completed in a relatively short time. Therefore, the processing proceeds to S280, and the control device 220 starts the power supply in response to the request from the vehicle 100. On the other hand, when the predicted charging time is larger than the threshold value Ta (YES in S230), a waiting time of the waiting vehicle becomes long. Therefore, the control device 220 determines in S240 whether or not the remaining amount of fuel of the vehicle 100 included in the vehicle information is more than a reference value α. In other words, the control device 220 determines whether or not the vehicle can travel through a distance to another power supply facility in the vicinity, even when a charge amount in the battery 150 is exhausted, by using the drive force from the engine 120 or the power generated by the engine 120. The reference value α is, for example, 10 liters.

When the remaining amount of fuel is equal to or less than the reference value α (NO in S240), a traveling distance by the traveling using the engine 120 cannot be sufficiently secured and the battery 150 needs to be charged. Therefore, the control device 220 advances the processing to S280 to start the power supply in response to the request from the vehicle 100. On the other hand, when the remaining amount of fuel is larger than the reference value α (YES in S240), a certain traveling distance can be secured by the traveling using the drive force of the engine 120 or the power generated by the engine 120. Therefore, the control device 220 outputs an instruction to urge the vehicle 100 to shorten the charging time in S250. The instruction to shorten the charging time may be an instruction proposing a charging time shorter than a charging time requested for the battery 150 or an instruction proposing a charge amount smaller than a charge amount requested for the battery 150. The control device 220 outputs, together with the instruction to urge the shortening of the charging time, information on the discount on the unit price for charging when the instruction is accepted to the vehicle 100.

The response to the proposal of shortening the charging time is received from the vehicle 100, the control device 220 determines in S260 whether or not the user of the vehicle 100 has accepted the proposal of shortening the charging time. When the shortening of the charging time is not accepted (NO in S260), the control device 220 advances the processing to S280 to start the power supply in response to the request from the vehicle 100 since the user of the vehicle 100 wants the power supply in the power supply device 200. On the other hand, when the shortening of the charging time is accepted (YES in S260), the control device 220 starts the power supply with a discounted (reduced) unit price for charging as a consideration for the response to the request for shortening the charging time in S270 (S280). Although not shown in FIG. 3, S280 is skipped when the charging by the power supply device 200 is stopped in response to the proposal of shortening the charging time.

Regarding the reduction in the unit price for charging, the unit price for power in the power supply to be executed from now on may be reduced, or the unit price for power in the power supply subsequent times may be reduced. Further, the unit price for fuel at the time of refueling may be reduced in place of or in addition to the unit price for power.

As described above, when the power supply is requested for the hybrid electric vehicle with a large remaining amount of fuel when the power supply facility is congested, with notifying the vehicle of the instruction to urge the vehicle to shorten the charging time, it is possible to improve the rotation efficiency of the power supply facility and thus to preferentially execute the power supply to the battery electric vehicle. Further, with the reduction in the unit price for power and/or the unit price for fuel for the hybrid electric vehicle having shortened charging time, it is possible to provide an incentive for the charging time shortening.

Therefore, it is possible to effectively use the power supply facility without impairing the convenience of the user of the hybrid electric vehicle.

Second Embodiment

As a form of the external charging, "alternating-current charging" using the alternating-current power from a power supply device and "direct-current charging" using the direct-current power from a power supply device are known. In the direct-current charging, there is also known a power supply device capable of "direct-current rapid charging" in which power larger than power of the alternating-current charging is supplied from a power supply device to charge a battery in a shorter time.

In a second embodiment, in a power supply facility including an alternating-current power supply device capable of performing the alternating-current charging and a direct-current power supply device capable of performing the direct-current rapid charging, a configuration will be described in which the battery electric vehicle can preferentially use the direct-current power supply device to effectively use the power supply facility.

Figure 4:
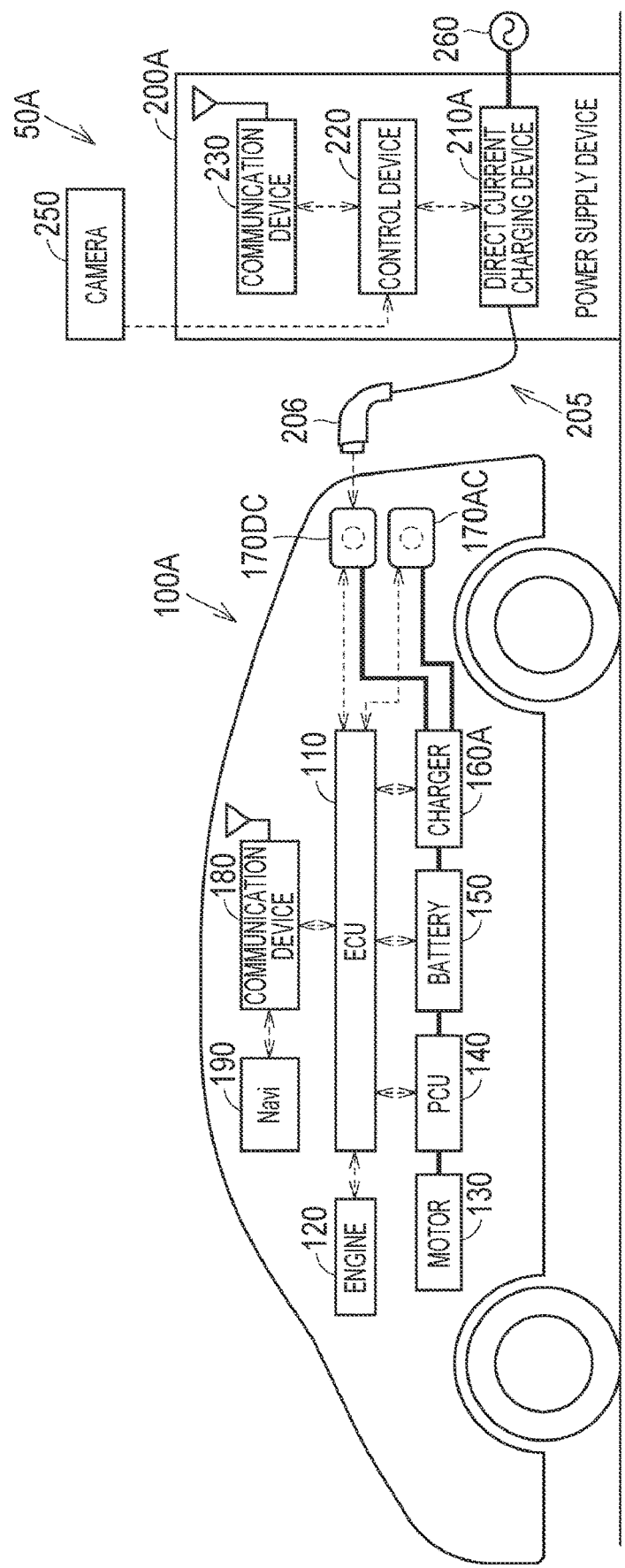
FIG. 4 is a functional block diagram of a vehicle and a power supply facility in a power supply system according to a second embodiment.

FIG. 4 is a functional block diagram of a vehicle 100A and a power supply facility 50A in a power supply system 10A according to the second embodiment. In FIG. 4, a description of the portion overlapping with the power supply system 10 of the first embodiment shown in FIG. 2 will not be repeated.

Figure 2:
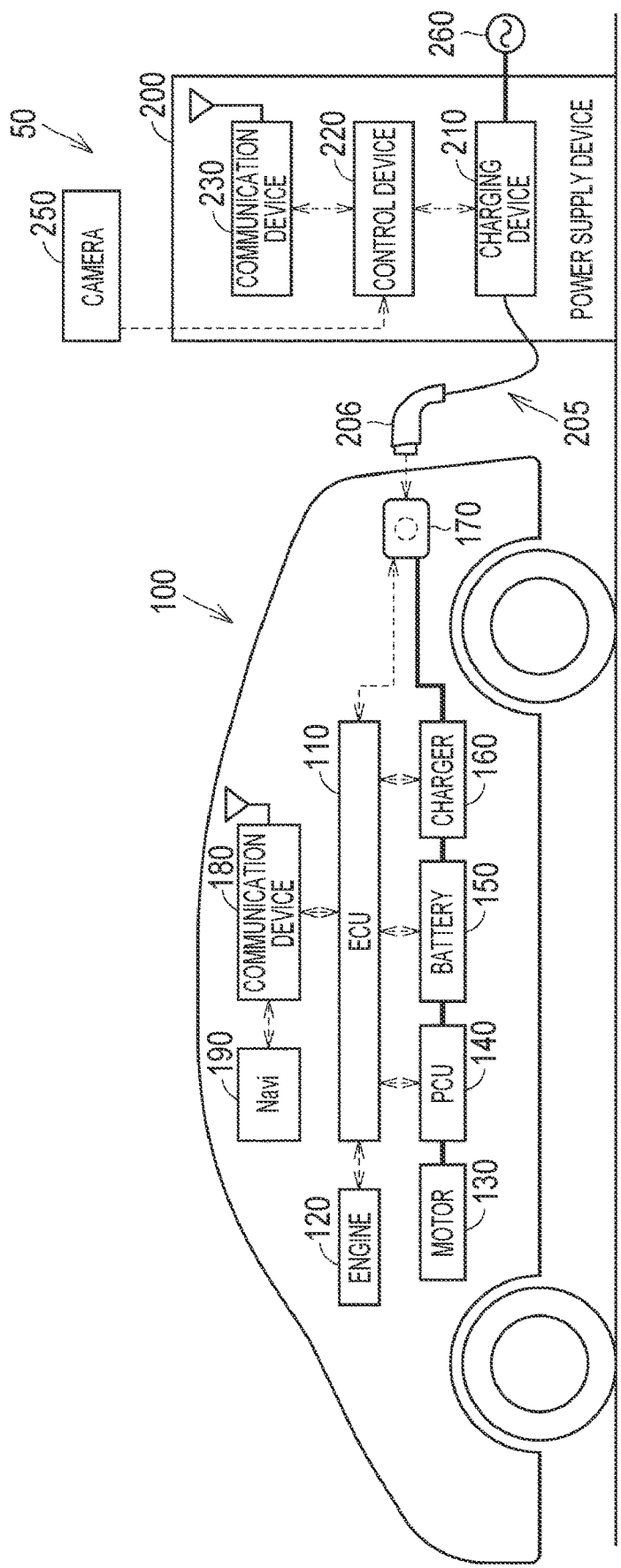
FIG. 2 is a functional block diagram for describing details of a vehicle and a power supply facility in FIG. 1.

With reference to FIG. 4, in the vehicle 100A, the charger 160 in the vehicle 100 shown in FIG. 2 is replaced with a charger 160A, and the inlet 170 is replaced with an inlet 170AC for the alternating-current charging and an inlet 170DC for the direct-current rapid charging. The power supply facility 50A includes a power supply device 200A. In the power supply device 200A, the charging device 210 in the power supply device 200 of FIG. 2 is replaced with a direct-current charging device 210A. That is, the power supply device 200 in FIG. 2 is an alternating-current power supply device, and the power supply device 200A in FIG. 4 is a direct-current power supply device. Although not shown in FIG. 4, the power supply facility 50A includes the power supply device 200 which is the alternating-current power supply device, in addition to the power supply device 200A which is a direct-current power supply device.

The direct-current charging device 210A in the power supply device 200A is configured to include an alternating current/direct current converter or a rectifier, converts the alternating-current power from the alternating-current power supply 260 disposed outside into the direct-current power, and supplies the converted power to the vehicle 100A via the power supply cable 205. The power that can be output from the power supply device 200A is larger than the power that can be output from the power supply device 200. Therefore, when the same amount of power is charged, the direct-current rapid charging using the power supply device 200A can complete the charging in a shorter time than the alternating-current charging using the power supply device 200.

In the vehicle 100A, when the alternating-current charging is performed, the connector 206 of the power supply cable 205 is connected to the inlet 170AC. When the direct-current rapid charging is performed, the connector 206 is connected to the inlet 170DC. A configuration may be employed in which a terminal for transmitting the alternating-current power and a terminal for transmitting the direct-current power are disposed in a common connector. In that case, the inlet on the vehicle side is also configured of a common inlet. The alternating-current power received by the inlet 170AC and the direct-current power received by the inlet 170DC are transmitted to the charger 160A.

The charger 160A includes an alternating current/direct current converter or a rectifier. When the battery 150 is charged by using the alternating-current power from the inlet 170AC, the charger 160A converts the alternating-current power into the direct-current power by the above-mentioned alternating current/direct current converter or rectifier to charge the battery 150. On the other hand, when the battery 150 is charged by using the direct-current power from the inlet 170DC, the charger 160A directly charges the battery 150 using the received direct-current power. Although the charger 160A may include a direct current/direct current converter, it is preferable to use the direct-current power from the inlet 170DC as it is in order to reduce a loss due to the power conversion.

As described in the first embodiment, from the viewpoint of suppressing the out of electricity of the battery electric vehicle, it is preferable to prioritize the charging of the battery electric vehicle over the hybrid electric vehicle. Therefore, in a case of the power supply facility provided with the power supply device capable of performing the direct-current rapid charging, it is preferable to apply the direct-current rapid charging to the battery electric vehicle rather than the hybrid electric vehicle. Thus, in the second embodiment, when the direct-current rapid charging is requested from the hybrid electric vehicle capable of performing the alternating-current charging and the direct-current rapid charging when the power supply facility is congested, control of making a proposal of urging the hybrid electric vehicle to perform changing to the alternating-current charging by the alternating-current power supply device is executed. When the user of the hybrid electric vehicle accepts a shift to the alternating-current power supply device, the unit price for power and/or the unit price for fuel is discounted as the consideration. Accordingly, it becomes possible to preferentially use the direct-current rapid charging by the battery electric vehicle, suppress the deterioration of the convenience of the user of the hybrid electric vehicle, and thus effectively use the power supply facility as a whole.

Figure 5:
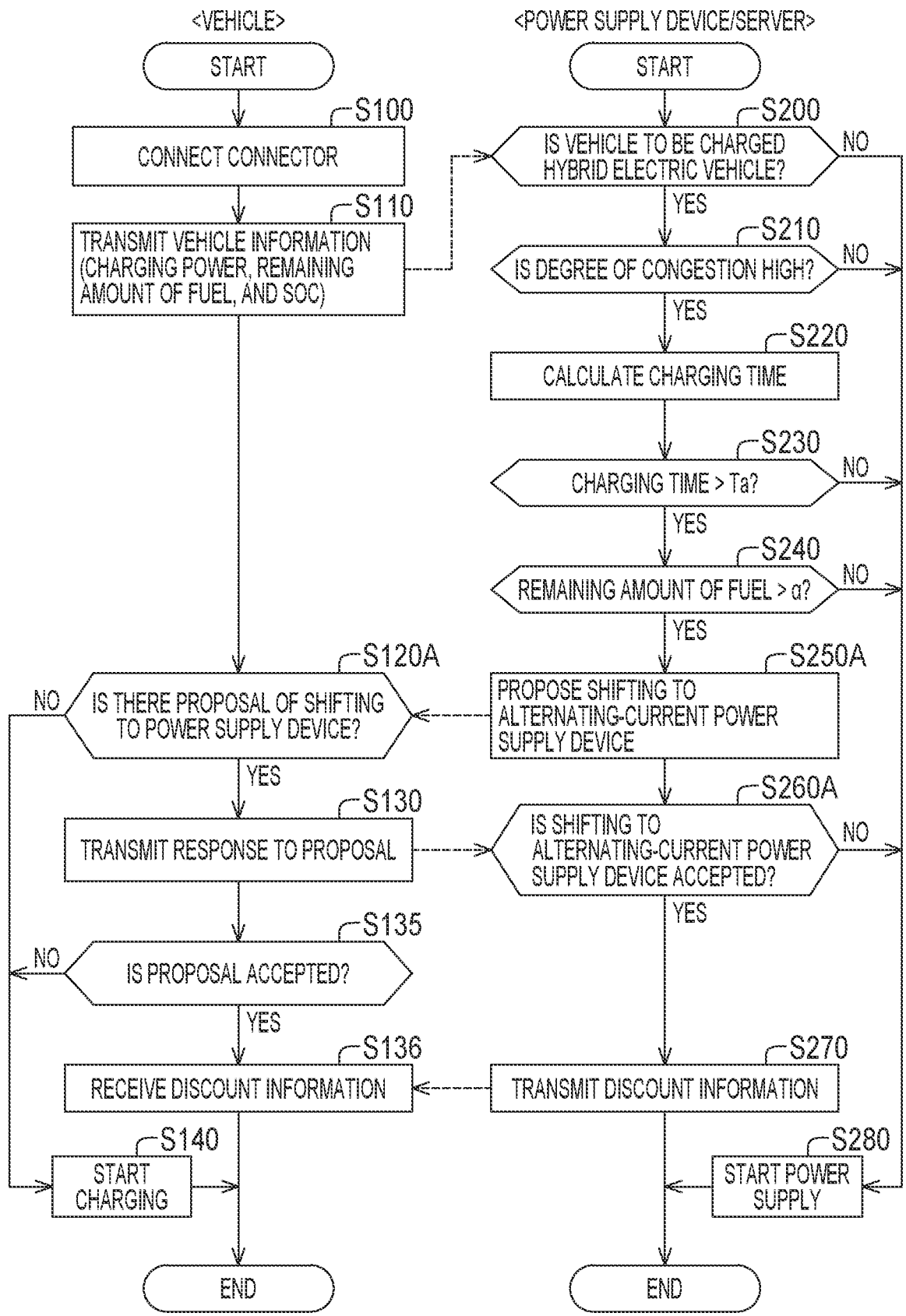
FIG. 5 is a flowchart for describing control executed in the power supply system of FIG. 4.

FIG. 5 is a flowchart for describing the congestion alleviation control executed in the power supply system 10A of the second embodiment. FIG. 5 shows a flowchart executed in the ECU 110 of the vehicle 100A and the control device 220 of the power supply device 200A. As in the first embodiment, a part or all of the control of the power supply device 200A may be executed by the server 300. In the control of the vehicle 100A, steps S135 and S136 are added to the flowchart of FIG. 3. Further, in the control of the power supply device 200A, steps S250 and S260 in the flowchart of FIG. 3 are replaced with steps S250A and S260A. In FIG. 5, a description of the steps overlapping with FIG. 3 will not be repeated.

First, the control of the power supply device 200A will be described with reference to FIG. 5. When the degree of congestion is large, the predicted charging time is larger than the threshold value Ta, and the remaining amount of fuel is larger than the reference value α, the direct-current rapid charging is requested from the vehicle 100A to the direct-current power supply device (YES in S240), the processing proceeds to S250A, and the control device 220 outputs an instruction to urge the vehicle 100A to shift to the alternating-current power supply device to perform the alternating-current charging. In this case, the control device 220 also outputs the information on the discount of the unit price for charging to the vehicle 100A when the instruction is accepted and the shift to the alternating-current power supply device is made.

When the response to the proposal of shifting to the alternating-current power supply device is received from the vehicle 100A, the control device 220 determines in S260A whether or not the user of the vehicle 100 has accepted the proposal of shifting to the alternating-current power supply device. When the shift to the alternating-current power supply device is not accepted (NO in S260A), the control device 220 advances the processing to S280 to start the direct-current rapid power supply in response to the request from the vehicle 100A since the user of the vehicle 100A wants the direct-current rapid power supply. On the other hand, when the shift to the alternating-current power supply device is accepted (YES in S260A), the control device 220 provides the discount information available in the charging subsequent times to the vehicle 100A as the consideration for the response to the request for shifting to the alternating-current power supply device in S270.

Although not shown in FIG. 5, when the request from the control device 220 is accepted, the user of the vehicle 100A shifts from the power supply device 200A to the power supply device 200, which is the alternating-current power supply device, to perform the alternating-current charging. In this case, with the use of the above discount information, the unit price for power is reduced.

Next, the control in the vehicle 100A will be described. When the connector 206 of the power supply cable 205 provided in the power supply device 200A, which is the direct-current power supply device, is connected to the inlet 170DC and the vehicle information is transmitted to the power supply device 200A via the power supply cable 205, the ECU 110 determines whether or not the instruction to urge the shifting to the alternating-current power supply device is proposed from the power supply device 200A in S120A. When there is no proposal of shifting to the alternating-current power supply device from the power supply device 200A (NO in S120A), the processing proceeds to S140, and the ECU 110 executes the direct-current rapid power supply for the battery 150 using the power supplied from the power supply device 200A.

On the other hand, when there is a proposal of shifting to the alternating-current power supply device front the power supply device 200A (YES in S120A), the processing proceeds to S130, and the ECU 110 transmits the response as to whether or not the proposal is accepted to the power supply device 200A according to the user's operation. Then, the ECU 110 determines in S135 whether or not the proposal of shifting to the alternating-current power supply device is accepted in the response to the power supply device 200A.

When the shift to the alternating-current power supply device is not accepted (NO in S135), the processing proceeds to S140, and the ECU 110 executes the direct-current rapid charging for the battery 150 using the power supplied from the power supply device 200A since the user wants the charging in the power supply device 200A. On the other hand, when the shift to the alternating-current power supply device is accepted (YES in S135), the ECU 110 receives the discount information from the power supply device 200A in S136. Thereafter, the user of the vehicle 100A shifts to the power supply device 200, which is the alternating-current power supply device in the power supply facility 50A, or another power supply facility to execute the charging. In this case, by using the discount information received from the power supply device 200A, the charging is performed with the reduced unit price for charging. In addition, as in the first embodiment, the unit price for fuel at the time of refueling may be reduced in place of or in addition to the unit price for power.

As described above, when the direct-current rapid charging is requested from the hybrid electric vehicle with a large remaining amount of fuel when the power supply facility is congested, with notifying the vehicle of the instruction to urge the shifting to the alternating-current power supply device, it is possible to preferentially perform the direct-current rapid charging by the battery electric vehicle. Further, with the reduced unit price for power and/or unit price for fuel for the hybrid electric vehicle that has accepted the shifting to the alternating-current power supply device, it is possible to provide an incentive for the shift to the alternating-current power supply device. Therefore, it is possible to effectively use the power supply facility without impairing the convenience, of the user of the hybrid electric vehicle.

Third Embodiment

In the power supply system of the first and second embodiments, the configuration has been described in which the shortening of the charging time or the shift to the alternating-current power supply device is proposed when the connector of the power supply cable provided in the power supply device is connected to the inlet of the vehicle.

In a third embodiment, in a system in which the use of a power supply facility can be reserved from a mobile terminal or the like through wireless communication or a communication network, a configuration will be described in which the hybrid electric vehicle is urged to be charged with another power supply facility according to a congestion situation of the power supply facility such that the power supply facility can be preferentially used for the power supply for the battery electric vehicle.

The power supply system of the third embodiment basically has the same configuration as the power supply system 10 of FIG. 2 described in the first embodiment. The power supply device may be an alternating-current power supply device such as the power supply device 200 of the first embodiment or a direct-current power supply device such as the power supply device 200A of the second embodiment.

The power supply system of the third embodiment is configured such that the power supply device 200 can be reserved for the power supply before the vehicle 100 arrives at the power supply facility by communication with the communication device 180 mounted on the vehicle 100 or communication with a mobile terminal, a personal computer, or the like via the communication network 400. In such a power supply system capable of the power supply reservation, when the power supply reservation request is received from the hybrid electric vehicle when the power supply facility is congested or when the power supply facility is congested after the power supply reservation is received and the battery electric vehicle is included in the waiting vehicles, it is preferable to prioritize the charging of the battery electric vehicle as described above.

Therefore, in the power supply system of the third embodiment, in a case of the above situation, with a proposal of urging the user of the hybrid electric vehicle to shift to another power supply facility in the vicinity where the degree of congestion is low, it is easy to execute the charging of the battery electric vehicle in the power supply facility. Then, for the hybrid electric vehicle that responds to the request to shift to another power supply facility, the unit price for charging power and/or the unit price for fuel is discounted as the consideration. Accordingly, it is possible to effectively use the power supply facility without impairing the convenience of the user of the hybrid electric vehicle.

Figure 6:
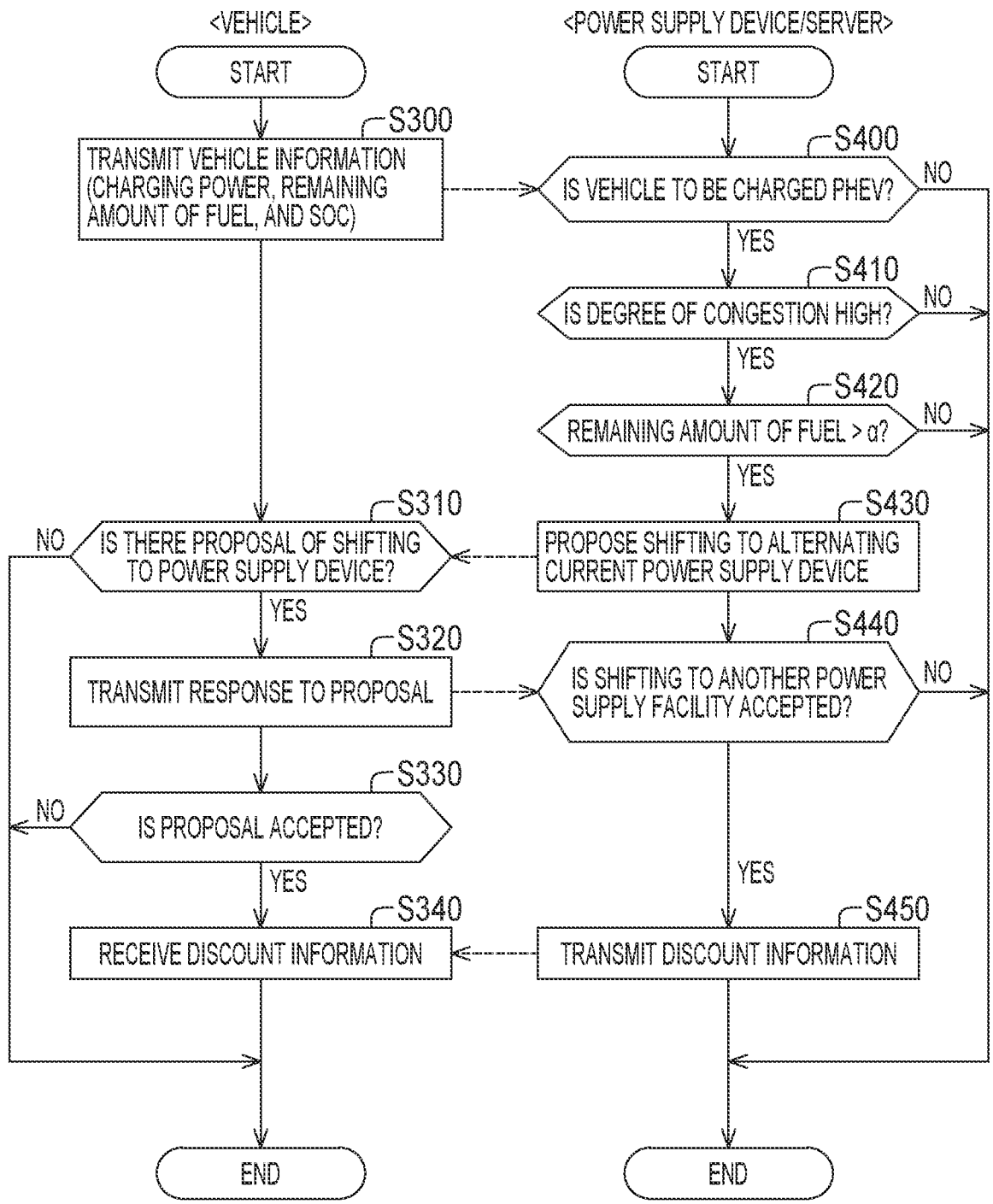
FIG. 6 is a flowchart for describing control executed in a power supply system according to a third embodiment.

FIG. 6 is a flowchart for describing the control executed in the power supply system according to the third embodiment. FIG. 6 shows a flowchart executed by the ECU 110 of the vehicle 100 and the control device 220 of the power supply device 200. As in the first and second embodiments, a part or all of the control of the power supply device 200 may be executed by the server 300.

First, the control in the power supply device 200 will be described with reference to FIG. 6. When the vehicle information is received from the vehicle 100 via the power supply cable 205, the control device 220 of the power supply device 200 determines in S400 whether or not the vehicle 100 to be charged is the hybrid electric vehicle. When the vehicle 100 to be charged is the battery electric vehicle instead of the hybrid electric vehicle (NO in S400) subsequent processing of S410 to S450 is skipped, and the control device 220 accepts the reservation from the vehicle 100 and ends the processing.

When the vehicle 100 to be charged is the hybrid electric vehicle (YES in S400), the processing proceeds to S410, and the control device 220 calculates the degree of congestion of the power supply facility 50 and the power supply device 200 based on the video from the camera 250 to determine whether or not the degree of congestion is larger than a predetermined value. The degree of congestion is determined based on, for example, the number of vehicles waiting for the power supply included in the video of the camera 250 and the current number of reserved vehicles.

When the degree of congestion (NO in S410), the priority charging of the battery electric vehicle is not requested. Therefore, the control device 220 accepts the reservation from the vehicle 100 and ends the processing. When the degree of congestion is high (YES in S410), the processing proceeds to S420, and the control device 220 determines whether or not the remaining amount of fuel of the vehicle 100 included in the vehicle information is larger than the reference value α.

When the remaining amount of fuel is equal to or less than the reference value α (NO in S420), the traveling distance by the traveling using the engine 120 cannot be sufficiently secured and the battery 150 needs to be charged. Therefore, the control device 220 accepts the reservation from the vehicle 100 and ends the processing. On the other hand, when the remaining amount of fuel is larger than the reference value α (YES in S420), a certain traveling distance can be secured by the traveling using the drive force of the engine 120 or the power generated by the engine 120. Therefore, the control device 220 outputs the instruction to urge the vehicle 100 to shift to another power supply facility in the vicinity in S430. The control device 220 outputs, together with the instruction to urge the shifting to another power supply facility, the information on the discount on the unit price for charging and the congestion situation of another power supply facility in the vicinity to the vehicle 100.

When the response to the proposal of shifting to another power supply facility is received from the vehicle 100, the control device 220 determines in S440 whether or not the user of the vehicle 100 has accepted the proposal of shifting to another power supply facility. When the shift to another power supply facility is not accepted (NO in S440), the control device 220 accepts the reservation from the vehicle 100 and ends the processing since the user of the vehicle 100 wants the power supply in the power supply device 200. On the other hand, when the shift to another power supply facility is accepted (YES in S440), the control device 220 provides the discount information available in the charging subsequent times to the vehicle 100 as the consideration for the response to the request for shifting to another power supply facility in S450. In addition, as in the first embodiment, the unit price for fuel at the time of refueling may be reduced in place of or in addition to the unit price for power.

Next, the control in the vehicle 100 will be described. When the power supply in the power supply device 200 is reserved by the operation of the user of the vehicle 100, the ECU 110 of the vehicle 100 transmits the reservation information to the power supply device 200 by wireless communication via the communication device 180 in S300. The reservation information includes, for example, information such as a vehicle ID, a power supply start point in time, SOC, a remaining amount of fuel, and allowable charging power.

Next, the ECU 110 determines in S310 whether or not the proposal of urging the shift to another power supply facility has been made from the power supply device 200. When there is no proposal of urging the shift to another power supply facility from the power supply device 200 (NO in S310), the ECU 110 skips subsequent processing and ends the processing. In this case, since the reservation in the power supply device 200 is maintained, the power supply by the power supply device 200 can be performed with going to the power supply facility at a reserved point in time.

On the other hand, when there is the proposal to urge the shift to another power supply facility from the power supply device 200 (YES in S310), the processing proceeds to S320, and the ECU 110 transmits, according to the user's operation, the response as to whether or not the proposal is accepted to the power supply device 200. Then, the ECU 110 determines in S330 whether or not the proposal of shifting to another power supply facility is accepted in the response to the power supply device 200.

When the shift to another power supply facility is not accepted (NO in S330), the ECU 110 skips subsequent processing and ends the processing since the user wants the charging in the power supply device 200. In this case, since the reservation in the power supply device 200 is maintained, the power supply by the power supply device 200 can be performed with going to the power supply facility at a reserved point in time.

On the other hand, when the shift to another power supply facility is accepted (YES in S330), the ECU 110 receives the discount information from the power supply device 200 in S340. In this case, since the reservation in the power supply device 200 is canceled, the user of the vehicle 100 shifts to another power supply facility to execute the charging. In this case, with the use of the discount information received from the power supply device 200, the charging is performed with the reduced unit price for charging.

The flowchart of FIG. 6 describes the control executed at a timing when the reservation is made from the vehicle 100. However, when the reservation from the vehicle 100 is once accepted and then the power supply facility is congested before a reserved start point in time for charging and the battery electric vehicle is included in the waiting vehicles, the control device 220 may request the user of the vehicle 100 to shift to another power supply facility even after the reservation is accepted.

Further, the shortening of the charging time may be requested as in the first embodiment in place of or in addition to the proposal of shifting to another power supply facility. Alternatively, when the direct-current rapid charging using the direct-current power supply device is requested in the reservation information of the vehicle 100, the changing to the alternating-current charging may be requested as in the second embodiment.

As described above, when the use of the power supply device is reserved from the hybrid electric vehicle with a large remaining amount of fuel, with notifying the vehicle of the instruction to urge the shifting to another power supply device at a time when the power supply device is expected to be congested at the reserved start point in time for charging, it is possible to preferentially execute the power supply to the battery electric vehicle. In addition, with the reduction in the unit price for power and/or the unit price for fuel for the hybrid electric vehicle that has accepted the shift to another power supply device, it is possible to provide an incentive for the shift to another power supply device. Therefore, it is possible to effectively use the power supply facility without impairing the convenience of the user of the hybrid electric vehicle.

The embodiments disclosed this time is requested to be considered to be exemplary and not restrictive in all respects. The scope of the present disclosure is indicated by the claims rather than the description of the embodiments described above, and all modifications within the meaning and scope equivalent to the claims are intended to be included.

What is claimed is:

1. A power supply system comprising:
a vehicle equipped with a battery that is chargeable using power from an outside;
a power supply device that supplies the power to the vehicle; and
a control device configured to control power supply from the power supply device to the vehicle, wherein:
the vehicle includes
an engine, and
a motor that receives the power supplied from the battery to generate traveling drive force; and
when the power supply by the power supply device is requested from the vehicle, the control device
acquires a remaining amount of fuel for the engine from the vehicle,
outputs an instruction to urge the vehicle to shorten a charging time when the remaining amount of fuel is larger than a reference value, the instruction including information indicating a charging time shorter than a request charging time requested for the battery, and
sets at least one of a unit price for charging power or a unit price for fuel lower when a response to accept the instruction is received from the vehicle compared with when the instruction is not accepted.

2. The power supply system according to claim 1, wherein the instruction includes information proposing a charge amount smaller than a charge amount requested for the battery.

3. A power supply system comprising:
a vehicle equipped with a battery that is chargeable using power from an outside;
a power supply facility including a power supply device configured to supply the power to the vehicle; and
a control device configured to control power supply to the vehicle in the power supply facility, wherein:
the power supply device includes an alternating-current power supply device and a direct-current power supply device;
the vehicle includes
an engine, and
a motor that receives the power supplied from the battery to generate traveling drive force;
the vehicle is able to support both alternating-current charging using alternating-current power from the alternating-current power supply device and direct-current rapid charging using direct-current power from the direct-current power supply device; and
when the power supply by the direct-current power supply device is requested from the vehicle, the control device
acquires a remaining amount of fuel for the engine from the vehicle,
outputs an instruction to urge the vehicle to perform the power supply by the alternating-current power supply device when the remaining amount of fuel is larger than a reference value, the instruction including information indicating a charging time shorter than a request charging time requested for the battery, and
sets at least one of a unit price for charging power or a unit price for fuel lower when a response to accept the instruction is received from the vehicle compared with when the instruction is not accepted.

4. The power supply system according to claim 1, further comprising a camera that detects a state of the power supply device,
wherein the control device outputs the instruction when the power supply device is determined to be congested from a video of the camera.

5. A power supply system comprising:
a vehicle equipped with a battery that is chargeable using power from an outside;
a power supply facility including a power supply device configured to supply the power to the vehicle;
a camera that detects a state of the power supply device; and
a control device configured to control power supply from the power supply device to the vehicle, wherein:
the vehicle includes
an engine,
a motor that receives the power supplied from the battery to generate traveling drive force, and
a communication device configured to perform wireless communication with the power supply device; and
when the power supply by the power supply device is reserved from the vehicle and the power supply device is determined to be congested from a video of the camera, the control device
acquires a remaining amount of fuel for the engine from the vehicle,
outputs an instruction to urge the vehicle to shift to another power supply facility when the remaining amount of fuel is larger than a reference value, the instruction including information indicating a charging time shorter than a request charging time requested for the battery, and
sets at least one of a unit price for charging power or a unit price for fuel lower when a response to accept the instruction is received from the vehicle compared with when the instruction is not accepted.

6. The power supply system according to claim 1, wherein the control device is disposed in the power supply device.

7. The power supply system according to claim 1, wherein the control device is a server configured to communicate with the power supply device.

8. A control device configured to control a power supply system that charges a battery mounted on a vehicle having an engine by using power from a power supply device, the control device comprising:

a processor; and a memory that stores a program executed by the processor, wherein the processor, when power supply by the power supply device is requested from the vehicle, acquires a remaining amount of fuel for the engine from the vehicle, outputs an instruction to urge the vehicle to shorten a charging time when the remaining amount of fuel is larger than a reference value, the instruction including information indicating a charging time shorter than a request charging time requested for the battery, and sets at least one of a unit price for charging power or a unit price for fuel lower when a response to accept the instruction is received from the vehicle compared with when the instruction is not accepted.

9. A method for controlling a power supply system that charges a battery mounted on a vehicle having an engine by using power from a power supply device, the method comprising:

a step of determining whether or not power supply by the power supply device is requested from the vehicle;

a step of acquiring a remaining amount of fuel for the engine from the vehicle;

a step of outputting an instruction to urge the vehicle to shorten a charging time when the power supply by the power supply device is requested and the remaining amount of fuel is larger than a reference value, the instruction including information indicating a charging time shorter than a request charging time requested for the battery; and a step of setting at least one of a unit price for charging power or a unit price for fuel lower when a response to accept the instruction is received from the vehicle compared with when the instruction is not accepted.

10. The power supply system according to claim 3, wherein the instruction includes information proposing a charge amount smaller than a charge amount requested for the battery.

* * * * *